United States Patent
Hill et al.

(10) Patent No.: US 10,160,302 B2
(45) Date of Patent: Dec. 25, 2018

(54) DYNAMICALLY ADJUSTABLE ENGINE MOUNTS FOR A MOTOR VEHICLE

(71) Applicant: GM GLOBAL TECHNOLOGY OPERATIONS LLC, Detroit, MI (US)

(72) Inventors: Wallace J. Hill, Commerce Township, MI (US); Mark A. Gehringer, Milford, MI (US); Dennis J. Kinchen, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/405,958

(22) Filed: Jan. 13, 2017

(65) Prior Publication Data
US 2018/0201113 A1 Jul. 19, 2018

(51) Int. Cl.
*B60K 5/12* (2006.01)
*F16F 15/00* (2006.01)
*F16F 15/02* (2006.01)

(52) U.S. Cl.
CPC .......... *B60K 5/1283* (2013.01); *B60K 5/1208* (2013.01); *F16F 15/002* (2013.01); *F16F 15/02* (2013.01); *B60Y 2400/48* (2013.01); *F16F 2230/18* (2013.01)

(58) Field of Classification Search
CPC ........ F02B 75/32; F02B 75/04; B60K 5/1208; F16F 2230/18; F16F 15/02; F16F 15/002; B60Y 2400/48
See application file for complete search history.

(56) References Cited

U.S. PATENT DOCUMENTS

| | | | | |
|---|---|---|---|---|
| 4,240,517 | A * | 12/1980 | Harlow, Jr. | ........ B60G 21/0551 180/295 |
| 2008/0192954 | A1* | 8/2008 | Honji | ..................... G10K 15/04 381/86 |
| 2012/0266844 | A1* | 10/2012 | Hagari | ................ F02D 41/1401 123/406.38 |
| 2015/0046031 | A1* | 2/2015 | Gagliano | ........... B60G 17/0152 701/37 |
| 2017/0292444 | A1* | 10/2017 | Kondo | ..................... F02B 75/04 |

* cited by examiner

*Primary Examiner* — Yonel Beaulieu
*Assistant Examiner* — Martin A Weeks
(74) *Attorney, Agent, or Firm* — Cantor Colburn LLP

(57) ABSTRACT

A vehicle includes a chassis, and a drivetrain supported by the chassis. The drivetrain includes a prime mover and a transmission mechanically linked to the prime mover. At least one dynamically adjustable engine mount connects the drivetrain to the chassis. The at least one dynamically adjustable engine mount includes a selectively adjustable parameter. One or more sensors is associated with the vehicle. The one or more sensors is operable to detect one or more vehicle parameters. A control system is operatively connected to the at least one dynamically adjustable engine mount and the one or more sensors. The control system is operable to alter the selectively adjustable parameter of the at least one dynamically adjustable mount to substantially isolate the chassis from lateral shudder of the drivetrain in response to the one or more vehicle parameters.

18 Claims, 1 Drawing Sheet

DYNAMICALLY ADJUSTABLE ENGINE MOUNTS FOR A MOTOR VEHICLE

Exemplary embodiments relate to the art of motor vehicles and, more particularly to dynamically adjustable engine mounts for a motor vehicle.

Many vehicles include a transverse mounted engine in a front wheel drive (TFWD) configuration. Providing a compact car with front wheel drive capability often leads to a transverse mounted engine geometry in order to meet vehicle packaging goals. TFWD systems often include component geometries that create undesirable driving phenomenon. For example, TFWD vehicles may experience take off shudder when accelerating from a stop. Vehicle shudder may occur at a low speed drive away acceleration. Shudder may also occur during other driving scenarios. Higher half shaft angles, typically associated with TFWD vehicles, often lead to perceivable shudder during acceleration to a specific speed. The existence of shudder may be negatively received by certain consumers resulting in increased warranty requests and vehicle returns. Accordingly, it is desirable to provide a system that may mitigate occurrences of shudder to improve consumer perceptions and increase customer satisfaction.

SUMMARY

In accordance with an aspect of an exemplary embodiment, a vehicle includes a chassis, and a drivetrain supported by the chassis. The drivetrain includes a prime mover and a transmission mechanically linked to the prime mover. At least one dynamically adjustable engine mount connects the drivetrain to the chassis. The at least one dynamically adjustable engine mount includes a selectively adjustable parameter. One or more sensors is associated with the vehicle. The one or more sensors is operable to detect one or more vehicle parameters. A control system is operatively connected to the at least one dynamically adjustable engine mount and the one or more sensors. The control system is operable to alter the selectively adjustable parameter of the at least one dynamically adjustable mount to substantially isolate the chassis from lateral shudder of the drivetrain in response to the one or more vehicle parameters.

In addition to one or more of the features described above or below, or as an alternative, further embodiments could include wherein the at least one dynamically adjustable engine mount includes a first dynamically adjustable engine mount operatively connecting the prime mover and the chassis and a second dynamically adjustable engine mount operatively connecting the transmission and the chassis.

In addition to one or more of the features described above or below, or as an alternative, further embodiments could include wherein the selectively adjustable parameter includes at least one of a stiffness parameter and a damping parameter.

In addition to one or more of the features described above or below, or as an alternative, further embodiments could include wherein the one or more vehicle parameters includes a speed rate-of-change and a pedal position.

In addition to one or more of the features described above or below, or as an alternative, further embodiments could include wherein the one or more vehicle parameters includes a vehicle speed range.

In addition to one or more of the features described above or below, or as an alternative, further embodiments could include wherein the vehicle speed range is between about 1 MPH (1.6 KPH) to about 30 MPH (48.3 KPH).

In addition to one or more of the features described above or below, or as an alternative, further embodiments could include wherein the vehicle speed range is between about 5 MPH (8.0 KPH) and about 25 MPH (40.2 KPH).

In addition to one or more of the features described above or below, or as an alternative, further embodiments could include wherein the at least one dynamically adjustable engine mount includes a default tuning characteristic, the control system being operable to revert to the default tuning characteristic following a detection of a trigger condition comprising a vehicle speed threshold.

In addition to one or more of the features described above or below, or as an alternative, further embodiments could include wherein the at least one dynamically adjustable engine mount limits transmission of drivetrain shudder to the chassis.

In addition to one or more of the features described above or below, or as an alternative, further embodiments could include wherein at least one dynamically adjustable engine mount controls vibrations below 20 Hz.

In addition to one or more of the features described above or below, or as an alternative, further embodiments could include wherein the drivetrain comprises a transverse mounted front wheel drive drivetrain.

In accordance with another aspect of an embodiment, a method of isolating a drivetrain from a vehicle chassis includes detecting a parameter of a vehicle, adjusting a selectively adjustable parameter of at least one dynamically adjustable engine mount operatively connecting a drivetrain component to the vehicle chassis based on the parameter, and limiting transmission of lateral shudder of the drivetrain to the vehicle chassis through the at least one dynamically adjustable engine mount.

In addition to one or more of the features described above or below, or as an alternative, further embodiments could include wherein detecting the parameter includes detecting a speed of the vehicle.

In addition to one or more of the features described above or below, or as an alternative, further embodiments could include wherein adjusting the selectively adjustable parameter based on the parameter includes adjusting the selectively adjustable parameter if the speed of the vehicle is between about 1 MPH (1.6 KPH) to about 30 MPH (48.3 KPH).

In addition to one or more of the features described above or below, or as an alternative, further embodiments could include wherein adjusting the selectively adjustable parameter based on the parameter includes adjusting the selectively adjustable parameter if the speed of the vehicle is between about 5 MPH (8.0 KPH) and about 25 MPH (40.2 KPH).

In addition to one or more of the features described above or below, or as an alternative, further embodiments could include wherein adjusting the selectively adjustable parameter includes selectively adjusting at least one of a stiffness parameter and a damping parameter of the at least one dynamically adjustable engine mount.

In addition to one or more of the features described above or below, or as an alternative, further embodiments could include detecting a trigger condition, and reverting the at least one dynamically adjustable engine mount to a default tuning characteristic of the at least one dynamically adjustable engine mount following detection of the trigger condition.

In addition to one or more of the features described above or below, or as an alternative, further embodiments could include wherein detecting the trigger condition includes detecting a vehicle speed in excess of a predetermined vehicle speed threshold.

In addition to one or more of the features described above or below, or as an alternative, further embodiments could include wherein limiting the transmission of lateral shudder of the drivetrain to the vehicle chassis includes controlling vibrations below 20 Hz.

The above features and advantages and other features and advantages of the exemplary embodiments are readily apparent from the following detailed description when taken in connection with the accompanying drawings.

BRIEF DESCRIPTION OF THE DRAWINGS

Other features, advantages and details appear, by way of example only, in the following detailed description of exemplary embodiments, the detailed description referring to the drawings in which.

DETAILED DESCRIPTION

Figure 1:
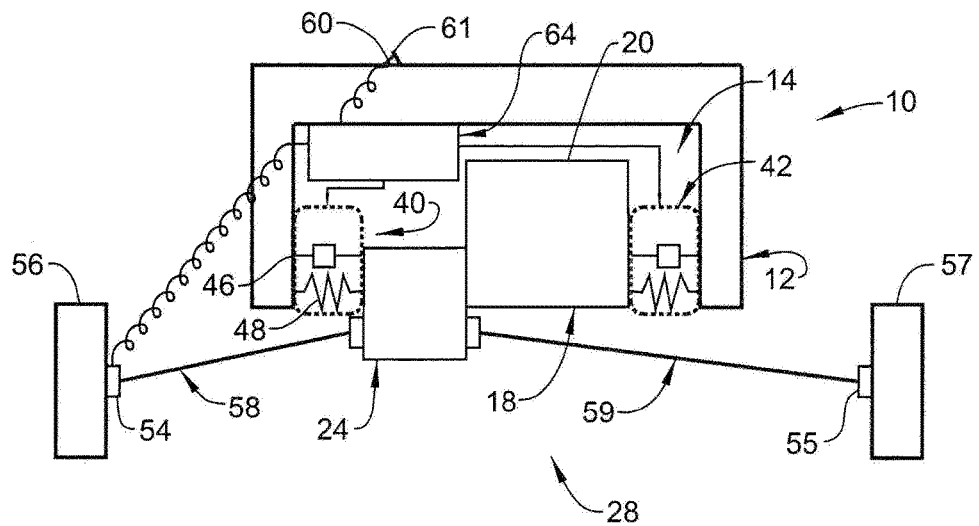
FIG. 1 is a schematic representation of a vehicle including a dynamically adjustable engine mount, in accordance with an exemplary embodiment.

The following description is merely exemplary in nature and is not intended to limit the present disclosure, its application or uses. It should be understood that throughout the drawings, corresponding reference numerals indicate like or corresponding parts and features. As used herein, the term "module" or "unit" refers to an application specific integrated circuit (ASIC), a field programmable gate array (FPGA), an electronic circuit, an electronic computer processor (shared, dedicated, or group) and memory that executes one or more software or firmware programs, a hardware microcontroller, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

A vehicle, in accordance with an exemplary embodiment, is indicated generally at 10 in FIG. 1. Vehicle 10 includes a chassis 12 which supports a body (not shown) and a drivetrain 14. Drivetrain 14 includes a prime mover 18, which may take the form of an internal combustion engine 20, and a transmission 24. It is to be understood that prime mover 18 may take on a variety of forms including hybrid engines, electric motors, and the like. In the exemplary embodiment illustrated, drivetrain 14 takes the form of a transverse mounted front wheel drive (TFWD) drive train 28.

In accordance with an aspect of an exemplary embodiment, drivetrain 14 is coupled to chassis 12 through a number of dynamically adjustable engine mounts. For example, a first dynamically adjustable engine mount 40 mechanically connects transmission 24 and chassis 12 and a second dynamically adjustable engine mount 42 mechanically connects prime mover 18 and chassis 12. Each dynamically adjustable engine mount 40, 42 includes one or more selectively adjustable parameters. For example, first dynamically adjustable engine mount 40 may include an adjustable dampener 46 operable to alter a damping parameter, and an adjustable stiffener 48 operable to adjust a stiffness parameter. Other mechanisms to control damping and stiffness may include active snubbers, hydraulic tracks, and/or dashpots. Of course, second dynamically adjustable engine mount 42 may include similar structure.

In accordance with an aspect of an exemplary embodiment, vehicle 10 includes a first wheel sensor 54 and a second wheel sensor 55. First wheel sensor 54 is associated with a first wheel 56 and second wheel sensor 55 is associated with a second wheel 57. First and second wheels 56 and 57 are operatively connected to transmission 24 through corresponding first and second shafts 58 and 59. First and second wheel sensors 54 and 55 may detect a speed (RPM) of corresponding ones of first and second wheels 56 and 57. First and second wheel sensors 54 and 55 may also detect a speed rate-of-change of corresponding ones of first and second wheels 56 and 57. Vehicle 10 may also include a pedal position sensor 60 operatively associated with an accelerator pedal 61. Pedal position sensor 60 may determine a degree of application of accelerator pedal 61. Pedal position sensor 60 may also detect a rate of change of pedal position of accelerator pedal 61.

In accordance with another aspect of an exemplary embodiment, vehicle 10 includes a control system 64 that is operatively connected to first and second dynamically adjustable engine mounts 40, 42 as well as first and second wheel sensors 54, 55 and pedal position sensor 60. In accordance with an exemplary embodiment, control system 64 selectively adjusts one or more of the damping parameter and the stiffness parameter of first and second dynamically adjustable engine mounts 40 and 42. More specifically, each dynamically adjustable engine mount 40, 42 includes a default tuning characteristic that limits the transmission of vibrations and the like from drivetrain 14 to chassis 12 during normal driving and standing conditions. The default tuning characteristic may be selectively adjusted to further reduce lateral force transmission from drivetrain 14 to chassis 12 during selected driving conditions, such as during a launch. In accordance with an aspect of an exemplary embodiment, control system 64, through first and second dynamically adjustable engine mounts 40 and 42 controls lateral force transmission between drivetrain 14 and chassis 12 below about 20 Hz.

Figure 2:
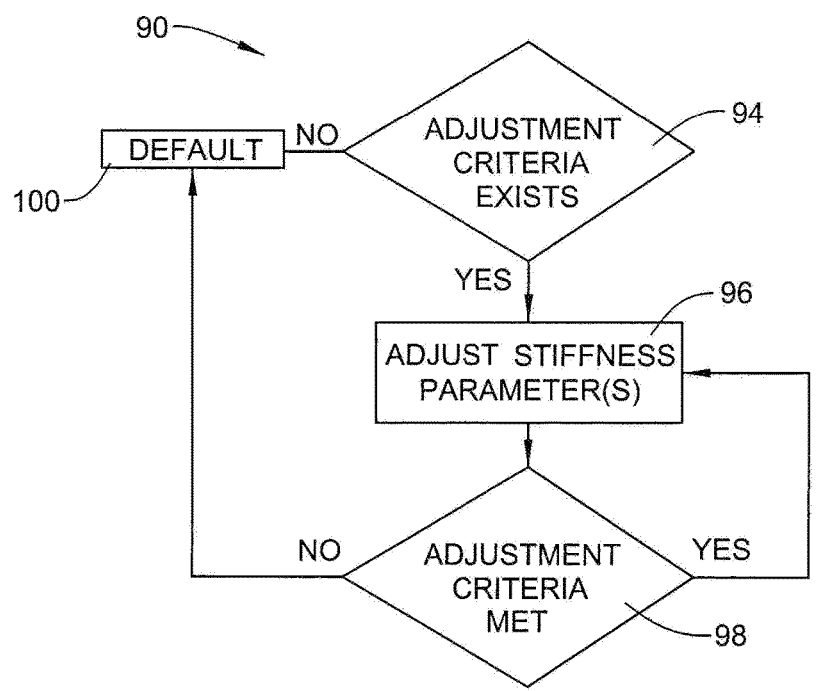
FIG. 2 is a flow chart illustrating a method of isolating a drivetrain from a vehicle chassis with dynamically adjustable engine mounts, in accordance with an aspect of an exemplary embodiment.

Reference will now follow to FIG. 2 in describing a method 90 of isolating drivetrain 14 from chassis 12 with dynamically adjustable engine mounts 40, 42. In accordance with an aspect of an exemplary embodiment, control system 64 determines whether an adjustment condition or criteria exists in block 94. For example, control system 64 may determine that vehicle 10 has initiated a launch from a stop or has accelerated from low speed operation. The term "launch" should be understood to describe acceleration from a complete stop such as from a traffic light, or from a low speed condition. In accordance with an aspect of an exemplary embodiment, the adjustment criteria may represent a vehicle speed range from about 1 MPH (1.6 KPH) to about 30 MPH (48.3 KPH). In accordance with another aspect of an exemplary embodiment, the adjustment criteria may represent a vehicle speed range from about 5 MPH (8.0 KPH) and about 25 MPH (40.2 KPH). Control system 64 may receive feedback from one or more of first and second wheel sensors 54 and 55 to determine that the adjustment criteria is met.

In accordance with another aspect of an exemplary embodiment, in addition to or as an alternative to, the adjustment criteria may take the form of pedal position. For example, a pedal position as sensed through peal position sensor 60 greater than about 5% and less than about 100% may be employed by control system 64 as a determining factor for selectively adjusting one or more of dynamically adjustable engine mounts 40, 42.

If vehicle 10 is operating at a predetermined parameter, such as a predetermined speed, a predetermined speed rate-of-change, a predetermined accelerator position and/or a rate-of-change of accelerator pedal 61, meeting the adjustment criteria, control system 64 may signal first and/or second dynamically adjustable engine mounts 40 and 42 to adjust one or more of the stiffness parameter and damping parameter as indicated in block 96. Control system 64 selectively adjusts first and/or second dynamically adjustable engine mounts 40 and 42 to limit transmission of shudder or other forces that may pass to chassis 12 from drivetrain 14 during, for example, a vehicle launch. In accordance with an exemplary aspect, control system 64 operates to limit transmission of oscillating forces at frequencies below 20 Hz. Adjustment may continue until a trigger condition, such as when a predetermined vehicle speed threshold, is met. For example, control system 64 determines, in block 98, whether vehicle 10 has achieved a speed that does not meet the adjustment criteria. If the adjustment criteria was not, or is no longer met, control system 64 ceases to adjust first and/or second dynamically adjustable engine mounts 40 and 42 revert to the default tuning characteristic as indicated in block 100. If the adjustment criteria is met in block 98, control system 64 adjusts the one or more of the stiffness parameter and damping parameter as indicated in block 96.

At this point, it is to be understood that exemplary embodiments provide a system for limiting the transmission of lateral vibrations, oscillations that may develop in a drivetrain to the vehicle chassis. Lateral vibrations and/or oscillations may develop as a result of drivetrain geometry. Excessive driveline angles may lead to high axial forces in a plunging tripot joint which, in turn, may excite a lateral rigid body mode of the powertrain causing vehicle vibration felt at the customer interfaces. The lateral vibrations and/or oscillations may lead to driver dissatisfaction and/or an increase in maintenance requests. By reducing the lateral vibrations and/or oscillations, the exemplary embodiments enhance an overall customer satisfaction factor as well as improves a customer's driving experience.

The terms "about" and "substantially" unless otherwise defined are intended to include the degree of error associated with measurement of the particular quantity based upon the equipment available at the time of filing the application. For example, "about" and "substantially" can include a range of ±8% or 5%, or 2% of a given value.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the invention not be limited to the particular embodiments disclosed, but will include all embodiments falling within the scope of the application.

What is claimed is:

1. A vehicle comprising:
   a chassis;
   a drivetrain supported by the chassis, the drivetrain including a prime mover and a transmission mechanically linked to the prime mover;
   at least one dynamically adjustable engine mount connecting the drivetrain to the chassis, the at least one dynamically adjustable engine mount including a selectively adjustable parameter, wherein the at least one dynamically adjustable engine mount includes a default tuning characteristic;
   one or more sensors associated with the vehicle, the one or more sensors being operable to detect one or more vehicle parameters; and
   a control system operatively connected to the at least one dynamically adjustable engine mount and the one or more sensors, the control system being operable to alter the selectively adjustable parameter of the at least one dynamically adjustable engine mount to substantially isolate the chassis from lateral shudder of the drivetrain in response to the one or more vehicle parameters, wherein, the control system is operable to revert to the default tuning characteristic following a detection of a trigger condition comprising a vehicle speed threshold.

2. The vehicle according to claim 1, wherein the at least one dynamically adjustable engine mount includes a first dynamically adjustable engine mount operatively connecting the prime mover and the chassis and a second dynamically adjustable engine mount operatively connecting the transmission and the chassis.

3. The vehicle according to claim 1, wherein the selectively adjustable parameter includes at least one of a stiffness parameter and a damping parameter.

4. The vehicle according to claim 1, wherein the one or more vehicle parameters includes a speed rate-of-change and a pedal position.

5. The vehicle according to claim 1, wherein the one or more vehicle parameters includes a vehicle speed range.

6. The vehicle according to claim 5, wherein the vehicle speed range is between about 1 MPH (1.6 KPH) to about 30 MPH (48.3 KPH).

7. The vehicle according to claim 6, wherein the vehicle speed range is between about 5 MPH (8.0 KPH) and about 25 MPH (40.2 KPH).

8. The vehicle according to claim 1, wherein the at least one dynamically adjustable engine mount limits transmission of drivetrain shudder to the chassis.

9. The vehicle according to claim 8, wherein at least one dynamically adjustable engine mount controls vibrations below 20 Hz.

10. The vehicle according to claim 1, wherein the drivetrain comprises a transverse mounted front wheel drive drivetrain.

11. A method of isolating a drivetrain from a vehicle chassis comprising:
    detecting a parameter of a vehicle;
    adjusting a selectively adjustable parameter of at least one dynamically adjustable engine mount operatively connecting a drivetrain component to the vehicle chassis based on the parameter;
    limiting transmission of lateral shudder of the drivetrain to the vehicle chassis through the at least one dynamically adjustable engine mount;
    detecting a trigger condition; and
    reverting the at least one dynamically adjustable engine mount to a default tuning characteristic of the at least one dynamically adjustable engine mount following detection of the trigger condition.

12. The method of claim 11, wherein detecting the parameter includes detecting at least one of a predetermined speed and a predetermined accelerator pedal position of the vehicle.

13. The method of claim 11, wherein detecting the parameter includes detecting a speed of the vehicle.

14. The method of claim 13, wherein adjusting the selectively adjustable parameter based on the parameter includes adjusting the selectively adjustable parameter if the speed of the vehicle is between about 1 MPH (1.6 KPH) to about 30 MPH (48.3 KPH).

15. The method of claim 14, wherein adjusting the selectively adjustable parameter based on the parameter includes adjusting the selectively adjustable parameter if the speed of the vehicle is between about 5 MPH (8.0 KPH) and about 25 MPH (40.2 KPH).

16. The method of claim 11, wherein adjusting the selectively adjustable parameter includes selectively adjusting at least one of a stiffness parameter and a damping parameter of the at least one dynamically adjustable engine mount.

17. The method of claim 11, wherein detecting the trigger condition includes detecting a vehicle speed in excess of a predetermined vehicle speed threshold.

18. The method of claim 11, wherein limiting the transmission of lateral shudder of the drivetrain to the vehicle chassis includes controlling vibrations below 20 Hz.

* * * * *